April 28, 1970 J. MORKOSKI ET AL Re. 26,871
MATERIAL CHOPPING AND COMMINUTING DEVICE
Original Filed March 22, 1965 2 Sheets-Sheet 1
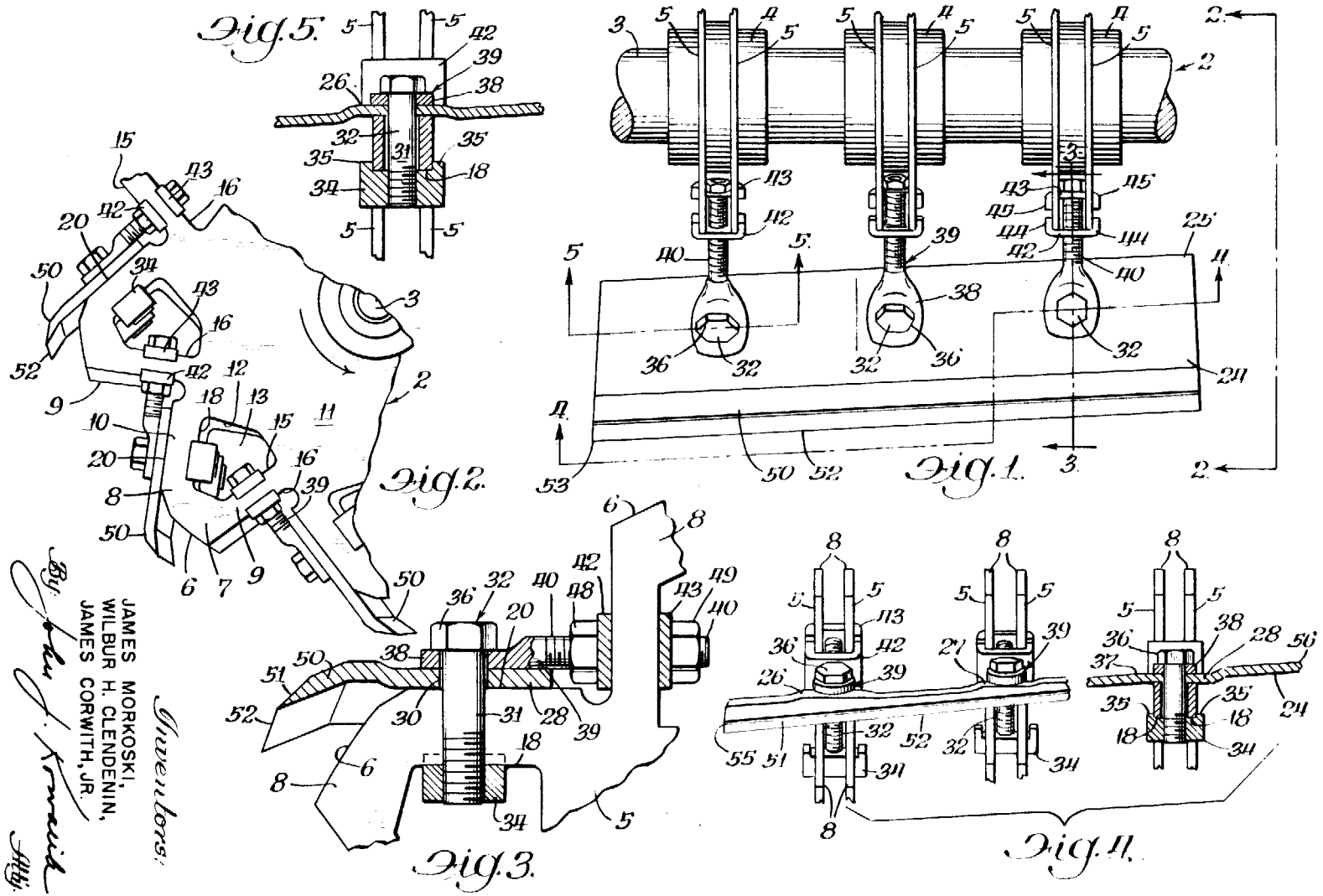
Inventors:
JAMES MORKOSKI,
WILBUR H. CLENDENIN,
JAMES CORWITH, JR.
By John J. Konwalik
Atty.

MATERIAL CHOPPING AND COMMINUTING DEVICE
Original Filed March 22, 1965 2 Sheets-Sheet 2
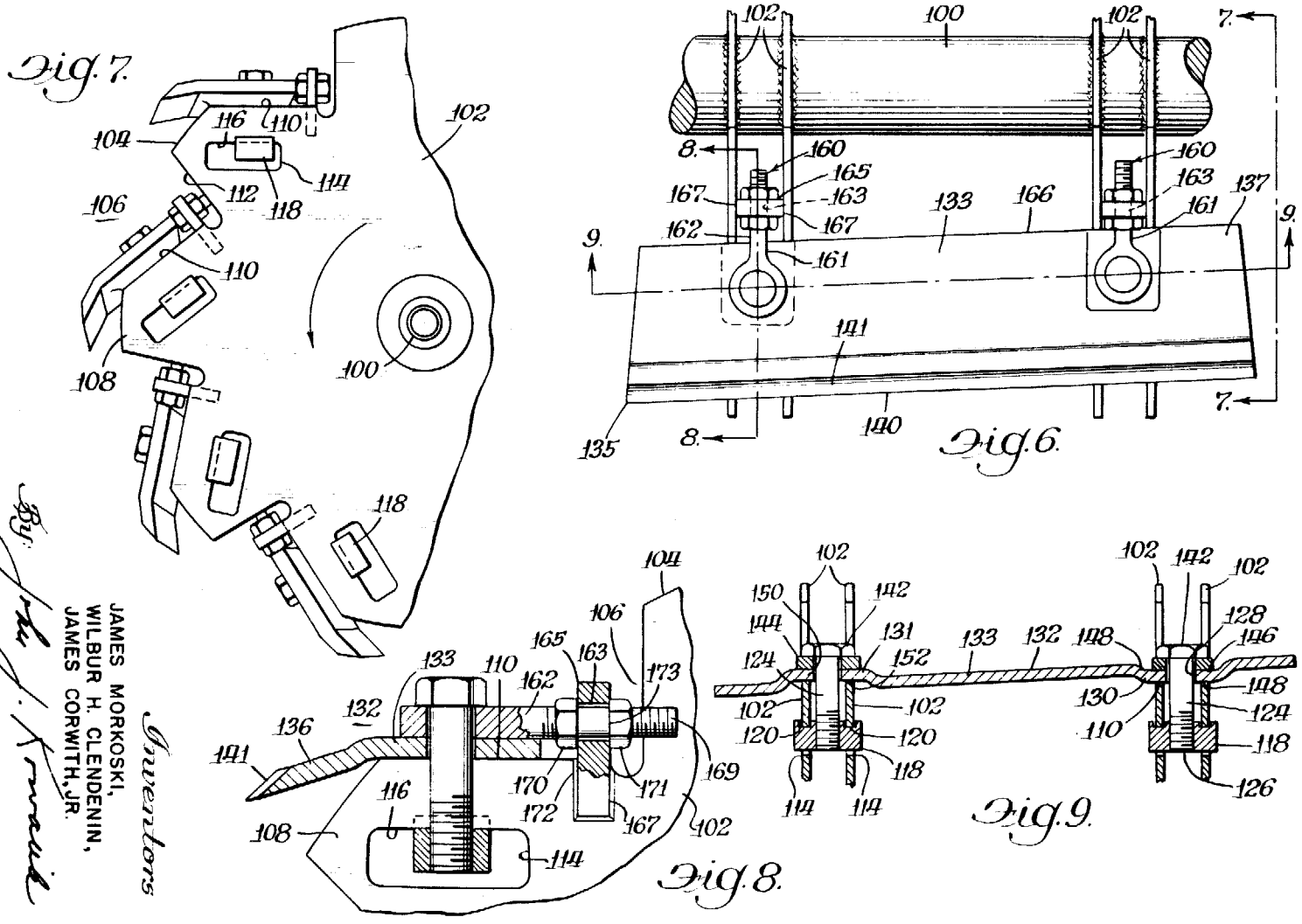
Inventors
JAMES MORKOSKI,
WILBUR H. CLENDENIN,
JAMES CORWITH, JR.
By John J. Konwalik
Atty.

United States Patent Office

Re. 26,871
Reissued April 28, 1970

26,871
MATERIAL CHOPPING AND COMMINUTING DEVICE

James Morkoski, Clarendon Hills, and Wilbur H. Clendenin, Ava, Ill., and James Corwith, Jr., Bettendorf, Iowa, assignors to International Harvester Company, Chicago, Ill., a corporation of Delaware Original No. 3,331,561, dated July 18, 1967, Ser. No. 441,673, Mar. 22, 1965. Application for reissue June 11, 1969, Ser. No. 835,888
Int. Cl. A01d *55/00;* B02c *18/18*
U.S. Cl. 146—117 14 Claims

Matter enclosed in heavy brackets [ ] appears in the original patent but forms no part of this reissue specification; matter printed in italics indicates the additions made by reissue.

*ABSTRACT OF THE DISCLOSURE*

*A chopper rotor comprising a center shaft, pairs of plates connected to the shaft and spaced axially thereon, each pair of plates having chordally positioned seating surfaces, a blade extending axially of the rotor seated upon axially correlated seating surfaces, bolt assemblies extending between the pairs of plates through openings in the blades, and a spanner between each pair of plates connected to the respective bolt and engaging abutment or bearing surfaces on the plates, the abutment surfaces elongated generally parallel with the seating surfaces and accommodating adjustment of the spanner with the blade.*

This invention relates to material cutting devices of the type comprising a cylindrical housing having an inlet and outlet and enclosing a cutterhead which comprises a rotary structure with at least several knives cooperating with a shear bar.

A general object of the invention is to provide a novel, simplified cutterhead construction incorporating a simple and efficient mounting for the knives from the support structure.

A further object of the invention is to provide a novel cutterhead comprising a mounting structure which includes pairs of axially spaced, relatively thin, plates carried and connected to a center shaft, the plates being provided with seating surfaces for the knives and an attachment means for securing and adjusting the knives to the support structure.

A still further object of the invention is to provide a novel chopper head wherein the blades and the seating areas on the support plates are so arranged so as to minimize normal complications in the mounting of the knives.

A still further object of the invention is to devise a novel chopper head, which in contrast to previous devices which employed specially-formed knife blades and complex attachments between the cylindrical support structure and the knife blades, provides a novel and simple knife structure wherein the seating areas of the knife blade are effected by a simple upset of the seating areas in order to obtain adequate engagement between the seating areas and the support seats and wherein the knives simulate, through the arrangement of the seating areas and their relation to the support, a curved knife construction without the inherent disadvantages incident to such curved knife structure.

A still further object of the invention is to provide a novel cutterhead which utilizes simple connections between the knife and the cylindrical support structure about the periphery thereof such that the knives may be easily adjusted and secured to the support structure.

In one embodiment of the invention it is contemplated to utilize a relatively thin flexible knife with a plurality of pre-formed seating areas which are upset from the plane of the flat rear portion of the knife blade, said seating areas being developed on a plurality of plates and the seating areas being indexed from one side of the rotor to the other in a trailing relation to provide a simulated spiral effect to the action of the knife.

Another object of the invention is to provide a novel chopper head construction wherein a plurality of relatively thin plates are utilized to provide a support for the knife, said plates being spaced axially of the rotor and being relatively thin so as not to obstruct the flow of material therebetween and at the same time providing rigidity to a relatively thin flexible knife mounted about the periphery thereof, such that a minimal mass is obtained in the rotor, the rotor thereby being adapted to be stopped more readily than a conventional rotor so that upon the introduction of an unshearable material relatively little damage will occur in the rotor.

Another embodiment of the invention contemplates an offset arrangement of seating areas in a rigid knife and a coplanar arrangement of seating areas on the rotor structure so disposed to the knife seating areas that planar movement of the knife will adjust the cutting edge to a common peripheral position with a lead at one end similar to a curved knife.

These and other objects and advantages inherent in the invention will become more readily apparent from the specification and the drawings wherein:

FIGURE 1 is a fragmentary plan view of one form of my novel rotor or chopper head;

FIGURE 2 is a fragmentary side elevational view of the structure of FIG. 1;

FIGURE 3 is an enlarged sectional view taken substantially on the line 3—3 of FIGURE 1;

FIGURE 4 is a fragmentary front view partly in section taken substantially on the line 4—4 of FIGURE 1;

FIGURE 5 is a sectional view taken substantially on the line 5—5 of FIGURE 1;

FIGURES 6 through 9 illustrate a further embodiment of the invention;

FIGURE 6 being a fragmentary plan view;

FIGURE 7 being a side elevational view taken substantially on the line 7—7 of FIGURE 6;

FIGURE 8 being an enlarged cross-sectional view taken substantially on the line 8—8 of FIGURE 1; and FIGURE 9 being a longitudinal or axial sectional view taken on the line 9—9 of FIGURE 1.

EMBODIMENT OF FIGURES 1–5

Referring now to FIGURES 1 through 5 illustrating the first embodiment of the invention, the rotor generally designated 2 comprises a center shaft 3 which is adapted to be mounted at opposite ends to an associated housing (not shown), as well known to those skilled in the art and as seen in U.S. Patent No. 2,450,277. The shaft 3 as shown in the present instance mounts three hub portions 4 which are spaced axially of the rotor or the shaft, said hub portions each being connected to the shaft 3 for rotation therewith and connected to pairs of plates 5, 5.

The plates 5, 5 which are of steel, and the plates 5, the hubs 4 and the shaft 3 are relatively thin as best seen in FIGURE 1. Plates 5, 5 are parallel. Each pair of plates 5, 5 is a generally annular structure having an angular peripheral edge 6 which is formed on the apices 7 of inwardly diverging integrally formed V-shaped mounting brackets generally designated 8. It will be seen that the mounting brackets 8 are formed on each plate in a regular geometrical pattern or array about the periphery of the plates and that each bracket 8 comprises a leading leg 9 and a trailing leg 10 and these legs are joined in the apex 7 at the outer extremities and at their inner extremities joined with the body portion 11 of the respective plate. These legs 9 and 10 collectively define with an opposing edge 12 of the body portion an axial aperture or opening 13. The leading leg 9 has inner and outer edges 15 and 16 which extend chordally with respect to the axis alpha ($\alpha$) of the rotor as best shown in FIGURE 2. The leg portions 10 extend generally chordally and provide generally parallel chordally extending inner surfaces 18 and outer seating surfaces 20. The three sets of plates provide a group of six axially adjacent brackets 8 as seen in FIGURE 4 which affords a mounting and a seat for a common knife blade 24. It will be understood that the seating surfaces 20 and thus brackets 8 of each group of brackets are indexed in that the leftward set of brackets 8 is slightly forward of the brackets 8 of the intermediate plates of the respective group and the brackets of the intermediate plates of the respective group are slightly forward of the brackets 8 of the plates at the right end of the rotor. It will also be understood that the surfaces 20 of each group of brackets lie at one point in planes which are tangent to a common circle and that the point of tangency of blade seating surfaces of the leftward set as seen in FIGURE 4 is forward of the point of tangency of the seats of the intermediate brackets which in turn are forward of the point of tangency of the plane of the seating surfaces of the rightwardmost brackets as viewed in FIGURE 4.

Each knife 24 is a relatively thin steel member and has a rear portion 25 which is somewhat rectangular in cross section. The rear section 25 is developed with seating areas indicated at 26, 27 and 28 which are offset from the plane of the flat blade and these seating areas on the underside are developed as planes of tangency to a common circle substantially coinciding with those points represented by the seating surfaces on the brackets. Thus, theoretically the knife has one position where it seats on the seating surfaces substantially flat against the corresponding seating surfaces of the bracket. Any other position occupied by the plane requires for the blade to be slightly twisted in order to bring the seating area into contact with the respective seating area on the associated brackets. Each knife is provided with openings 30 through the respective seating areas which admits a threaded shank portion 31 of a bolt generally designated 32. The shank portion 31 extends between the associated pair of plates and at its inner end is threaded into a spanner block or member 34 which straddles and spans the space between the adjacent plates 5, 5, and engages with the surfaces 18. The spanner block 34 is provided with a pair of outwardly directed flanges 35 at opposite ends, and said flanges 35 are disposed outwardly of the plates 5, 5, and prevent the nut portion or the spanner portion 34 from shifting axially. The upper end of the bolt 32 is provided with a head 36 which on its underside 37 (FIG. 3) engages with the eye portion 38 of an adjusting member generally designated 39, said eye portion 38 seating on the top surface of the associated seating area 26, 27 or 28. The eye portion 38 is connected to a shank portion 40 which projects rearwardly between the legs 9 of the bracket 6 located in trailing relation to the knife structure 24 ahead of the same in the direction of rotation as shown by the arrow in FIGURE 2. Each shank portion 40 stands through two U-shaped inner elements 42, 43 which respectively seat against the external and internal edges 15 and 16 of the legs 9 of the bracket rearwardly of the respective knife 24 and embrace the plates 5, 5, therebetween. It will be seen that the shank portion 40 is threaded and there is provided a locking nut 48 in front of the member 42 and an adjusting nut 49 behind the member 43. Thus to adjust blade and properly position the front diagonally slanted portion 50 of the blade, the nut 49 is advanced or retracted with respect to the shank portion 40 and thereafter in order to securely lock the parts in adjusted position the nut 48 is tightened. Of course, during the adjustment the bolt 32 is loosened and the spanner member 34 is accommodated sliding movement lengthwise along the surfaces 18 and the blade along surfaces 20.

The sharpened edge of the blades are positioned on a common cylinder and at their forward portions 50 are bevelled on their external sides 51 to provide a cutting edge 52. The blades are angled to obtain a leading point 53 and trailing point 54 and the seating areas 26, 27 and 28 are progressively shallower from the leading end 55 to the trailing end 56 of the blade. Also, the seating areas on the plates at the leading end are offset forwardly or circumferentially of the intermediate plate seating areas which are offset circumferentially forwardly of the seating areas of the plates 5 at the trailing end of the blade.

EMBODIMENTS OF FIGURES 6 TO 9

Referring now to the embodiment of the invention in FIGURES 6 through 9, it will be observed that the rotor or chopper comprises a center shaft 100 to which there are attached a plurality of thin radially-extending, axially-spaced plates 102. The plates 102 are arranged in pairs at opposite ends of the shaft 100 and each plate is of identical construction with the other.

Each plate is a substantially annular structure with a cylindrical periphery 104 which is interrupted in regular geometric sequence by a plurality of V-shaped notches 106 which in effect develop a corresponding number of V-shaped supports or mounting brackets 108. It will be seen that the corresponding brackets 108 of each plate 102 are in alignment axially of the rotor. Each bracket 108 provides a flat mounting surface or edge 110 and the surfaces 110 are arranged tangentially to a common circle concentric with the axis of the shaft 100. Of course, the surfaces 110 extend chordally with respect to the plates 102. The edges 110 and edges 112 of the succeeding bracket 108 define the aforementioned notch 106. The edges 112, as best seen in FIGURE 7, are preferably normal with respect to the edges 110 although of necessity they need not be. However, the construction shown optimizes the strength to the brackets inasmuch as the arrangement of the edges 112 and 110 of each bracket obtains a maximum circumferential width for the respective bracket. Circumferentially intermediate the edges 110 and 112 of each bracket, there is provided a transverse opening or slot 114 which is elongated generally parallel with the surface 110 and which provdes a seating edge 116 for a combination spanner and nut structure 118 which extends through the aligned openings 114 in the companion plates 102, as best seen in FIGURE 9. The spanner nut is provided with a pair of parallel grooves 120 which receive the portions of the respective bracket directly outwardly of the edge 116 and thus prevent axial shifting of the nut 118. It will be realized that the nut 118 is of lesser width than the longitudinal extent of the edges 116 whereby the nut is accommodated movement lengthwise of the edges 116 together with the shank or bolt 124 which is interthreaded with the nut 118. The shank 124 of each bolt 126 extends through an opening 128 in a seating area 130 or 131 in a knife blade 132.

Each knife blade 132 has a substantially flat rear portion 133 and the seating areas or portions 130, 131 at opposite ends of the blades are offset in opposite directions with respect to the plane of the portion 133 and at the leading end 135 of the blade, as best seen in FIGURE 6, the seating portion is offset upwardly in order to bring the forward portion 136 of the blade forwardly with respect to the trailing portion 137 of the blade. The designation "forward" and "rearwardly" and "leading" and "trailing" is with respect to the direction or rotation of the rotor as shown by the arrow in FIGURE 7. The seating portion 130 adjacent to the trailing portion of the blade is offset downwardly with respect to the plane of the portion 133 the portion forwardly thereof and the adjacent part of the blade is caused to be positioned rearwardly with respect to the leading portion. It will be realized also that the blade is angled from the leading end 135 to the trailing end 137 rearwardly as respects the direction of rotation whereby the cutting edge 140 leads at the end 135 and trails at the end 137. It will be noted from a consideration of FIGURE 8 that the forward portion 138 of the blade is angled inwardly of the rotor at an obtuse angle with respect to the plane of the portion 133. The outer side 139 of the blade is bevelled forwardly and inwardly as at 141.

Furthermore it will be noted that the generally rectangular seating areas or portions of the blade as best seen in FIGURE 6 are elongated at an obtuse angle with respect to the edge 140.

Each bolt 126 at the right has a head 142 which sits upon an eye 144 of an adjusting bolt 161, the eye in turn engaging a flat top surface 146 within the well or cavity or depression 148 formed by offsetting the seating portion 130 downwardly. The under surface 149 sits upon the respective edges 110 of the associated brackets 108. Similarly the bolt 124 at the leftward end of the rotor as seen in FIGURE 6 has a head 142 which engages an eye 144 of a bolt 161, which in turn seats on the top surface 150 of the upwardly offset segment 131. It will be seen that the surfaces 152 and 149 lie in a common plane and by the reverse offset of these mounting and seating areas the knife is disposed at its end 137 in a trailing relation with respect to the end 145 of the knife as respect to the direction of rotation of the knife.

The in and out position of each blade was controlled by the adjusting means generally indicated 160 which comprises the before-mentioned eyebolt 161, the eyes 144 of which admit the shanks 124 of the securing bolts 126. Each eyebolt 161 has a shank portion 162 which extends through an aperture 163 in a related anchor lug or member 165. The anchor members 165 extend widthwise between the associated plates 102 behind the rear edge 166 of each knife member[s] and are welded or otherwise connected at their lateral edges as at 167 to the plates 102. The rear end 169 of each bolt 162 is threaded and is provided with a pair of securing nuts 170, 171 which embrace the lug 165 therebetween and engage the front and rear sides 172 and 173 thereof, these nuts being tightened against opposite sides of the anchor lug 165 to hold the knife in selected adjusted position.

Thus it will be seen that in each instance a novel arrangement of seating areas on the rotor structure is provided together with a novel knife structure with said seating surfaces offset to obtain proper conformance between the knife and the seating surface in order to obtain a simulated spiral or helical affect and proper cutting attitude in an inexpensive but effective structure.

What is claimed is:

1. A chopper comprising a center shaft, a mounting structure comprising pairs of plates connected to the shaft and spaced axially thereof, each pair of plates having knife seating surfaces thereon extending chordally with respect to said shaft, a knife *seated* [seating sealed] upon the surfaces of each pair of plates, each pair of plates having a set of axially aligned transverse openings beneath the respective seating surfaces, a holding element extending through each set of openings and having flange portions flanking the remote sides of the related pair of plates, a bolt extending between each pair of plates through an opening in the knife and threaded into the respective holding element for drawing up the knife to the respective surfaces.

2. The invention according to claim 1 and adjusting means connected between each pair of plates and the bolt extending between the same for positioning the knife in various locations on said seating surfaces and projecting the knife various distances beyond the peripheries of said plates.

3. A chopper in the form of a cylinder comprising a center shaft, a plurality of pairs of plates connected to the shaft, each pair of plates having a plurality of symmetrically arranged circumferentially spaced peripheral notches therein, seating surfaces on the corresponding sides of each notch, said surfaces extending chordally with respect to said cylinder, blades extending transversely of said plates, and entered into corresponding notches in said pairs of plates, each said blade having seating portions equal in number to the pairs of plates, said portions offset with respect to the plane of the blade and angularly related to each other to lead one end of the blade with respect to the other, and means securing said blade to said plates against said surfaces.

4. A cylindrical shaped chopper rotor comprising a mounting and driving center shaft, plates spaced axially of the shaft, each plate having a plurality of chordally disposed peripheral seating surfaces and blades extending axially of the rotor across all of the plates and seated upon axially correlated surfaces, and means connecting said blades with each of the plates and including means for adjusting the positions of the blades inwardly and outwardly relative to the periphery of the rotor.

5. A chopping cylinder comprising a center shaft, a plurality of pairs of mounting plates connected to the center shaft, each pair of plates providing pairs of axially aligned circumferentially displaced seating surfaces, corresponding pairs of seating surfaces of the respective pairs of plates being in axial alignment, a common blade seated on corresponding pairs of axially aligned surfaces, said blade having seating areas offset with respect to each other circumferentially of the rotor from one end of the blade to the other whereby one end of the blade is caused to lead the other end in the direction of rotation of the rotor, and means securing said blades against the respective seating surfaces.

6. The invention according to claim 5 and said securing means comprising axially aligned apertures in each pair of plates disposed radially inwardly with respect to each pair of seating surfaces, a spanner member spanning the distance between said plates and extending through respective apertures, said blades having openings therethrough in alignment with the spaces between said pairs of plates and a tension bolt extending through each opening and connected to the respective spanner member inwardly thereof.

7. The invention according to claim 6 and adjusting means connected to the bolt and extending generally parallel to said seating surfaces, and a spanner block in said opening connected to said adjusting means.

8. In a rotary chopper, a mounting for successively arranged circumferentially spaced blades, a pair of axially spaced mounting plates rotatable about a predetermined axis, said plates presenting pairs of axially aligned outwardly facing circumferentially spaced seating surfaces, axially aligned apertures in the plates radially inwardly of each pair of surfaces, each aperture defined by inwardly facing edges generally paralleling the respective surfaces and other edges extending at a converging angle to said first-mentioned edges, a member spanning said first-mentioned edges, a securing element for each blade extending between the plates and connecting the blade to the respective plates against respective seating surfaces, said other edges serving as reaction areas, and adjusting means reactively connected between each blade and the other of the edges located therebehind with respect to the direction of rotation of the rotor.

9. In a rotor construction, a center shaft, a plurality of pairs of plates spaced axially of the shaft and connected thereto for rotation therewith about the axis thereof in a predetermined direction, each plate having a circumferential array of inverted V-shape mounting brackets about the outer periphery thereof, corresponding brackets of each pair of plates being axially aligned and constituting a set, each bracket having leading and trailing legs joined together in an outwardly directed apex, each leading leg presenting generally radially extending inner and outer edges, and each said trailing leg presenting chordally extending inwardly facing edges and chordally extending outwardly facing seating surfaces, corresponding sets of brackets being indexed with each other axially of the rotor and constituting a group of sets of brackets, a knife blade mounted on each group of sets of brackets, each blade comprising a generally flat rear section with seating areas equal in number to the sets of brackets in the group, said areas offset from the plane of said rear section to provide seating engagement therebetween, and said seating area having an opening therethrough, a first securing element extending through each opening between the associated pair of plates, a second securing element disposed beneath each first securing element and interlocked therewith and spanning and engaging the inwardly facing surfaces of the leading legs of the associated set of brackets, each blade having a sharpened forward portion projecting beyond the peripheries of said plates and providing a cutting edge, and means for adjusting each blade and positioning the cutting edge of each blade in a cylindrical path common to all of the blades, said adjusting means connected to the first securing elements and interlocked with the trailing legs therebehind of the associated set of brackets.

10. The invention according to claim 9 and each said adjusting means comprising a bolt having an eye at one end sleeved over the related first securing element and extending between the trailing legs of the associated brackets, outer and inner spanner elements respectively straddling the inner and outer edges of each of the trailing legs of the related set of brackets and having apertures admitting the related bolt therethrough, and nut means threaded on the bolt inwardly of the inner spanner element and outwardly of the outer spanner element and embracing the same therebetween and threaded on the bolt to tightly engage the rear legs between said inner and outer spanner elements.

*11. The invention according to claim 4 and wherein said means for adjusting the position of the blades comprises bearing surfaces on the plates beneath the seating surfaces for engagement by the securing means and said securing means is slidable along said bearing surfaces for adjusting the position of the respective blade.*

*12. The invention according to claim 5 and wherein said seating areas are also offset transversely of the plane of the blade.*

*13. A chopper comprising a center shaft, a mounting structure comprising pairs of plates connected to the shaft and spaced axially thereof, each pair of plates having blade seating surfaces extending chordally with respect to the axis of the shaft, a blade extending across all of said plates and seated upon the seating surfaces of each pair of plates, the plates of each pair having cooperating abutment means beneath each of said seating surfaces, a spanner extending between and in engagement with the cooperating abutment means, and a bolt extending between the pair of plates and interconnected to the blade and its related spanner.*

*14. A cylindrical shaped chopper rotor comprising a mounting and driving center shaft, pairs of plates spaced axially of the shaft and connected thereto for rotation therewith, each plate having a plurality of chordally disposed peripheral seating surfaces and blades extending axially of the shaft across all of the pairs of plates and seated upon axially correlated surfaces, means connecting said blades with each of the plates, and means connected between at least certain of said plates and the blades for retaining adjusted positions of the blades inwardly and outwardly relative to the periphery of the rotor.*

References Cited

The following references, cited by the Examiner, are of record in the patented file of this patent or the original patent.

UNITED STATES PATENTS

| | | | |
|---|---|---|---|
| 102,152 | 4/1870 | Porter | 241—194 |
| 329,756 | 11/1885 | Mershon | 144—225 |
| 391,949 | 10/1888 | Cottrell | 144—230 |
| 2,005,551 | 6/1935 | MacDonald | 51—246 |
| 1,542,812 | 6/1925 | Allison | 241—294 |
| 2,103,345 | 12/1939 | Taylor | 146—121 |

FOREIGN PATENTS

| | | |
|---|---|---|
| 1,256,708 | 2/1961 | France. |
| 43,752 | 2/1927 | Norway. |

ROBERT C. RIORDON, Primary Examiner

D. G. KELLY, Assistant Examiner

U.S. Cl. X.R.

241—192, 238, 291